June 14, 1938.  H. H. DECKER  2,120,351

CONTINUOUS VISCOSITY METER

Filed Oct. 7, 1937

INVENTOR:
Howard H. Decker,
BY Christian L. Nielsen
ATTORNEY.

Patented June 14, 1938

2,120,351

UNITED STATES PATENT OFFICE 2,120,351

CONTINUOUS VISCOSITY METER

Howard H. Decker, Fairview, N. J.

Application October 7, 1937, Serial No. 167,827

4 Claims. (Cl. 265—11)

This invention relates to means for continuously measuring viscosity of liquids and it consists in the constructions, arrangements and combinations herein described and claimed.

It is the cardinal purpose of the invention to provide means for measuring viscosity of a liquid in which an automatic temperature compensator is involved, insuring correction of variations in temperature, thereby measuring viscosity of a standard or uniform temperature.

It is also an object of the invention to provide a viscosity meter of simple construction and in which the device may be employed to indicate or record the viscosity of a liquid undergoing a test.

Additional objects, advantages and features of invention will be apparent from the following description considered in conjunction with the accompanying drawing, wherein—

Figure 1:
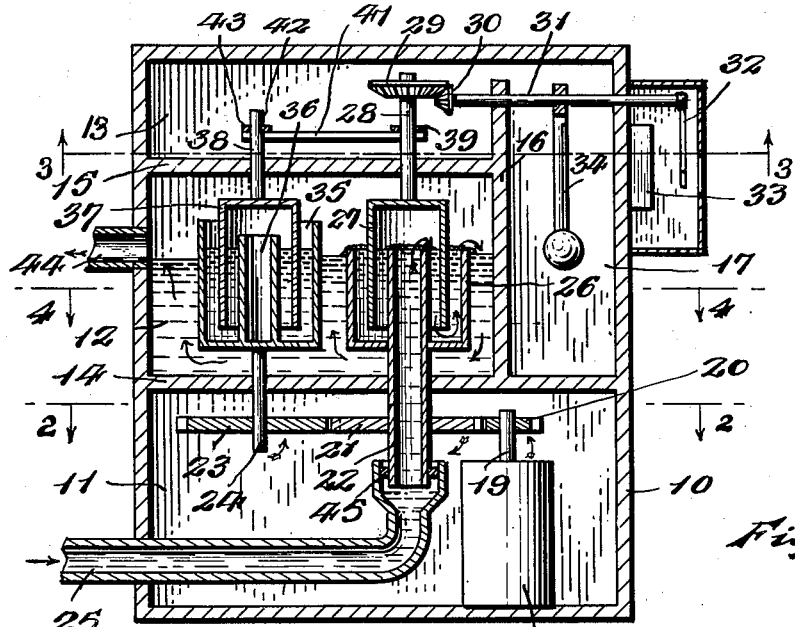
Figure 1 is a vertical sectional view of my invention.
Figure 2:
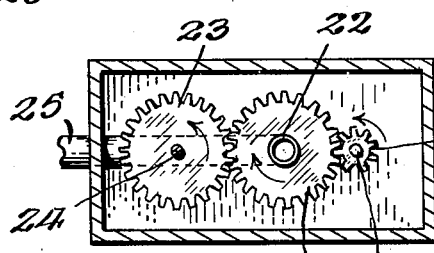
Figure 2 is a cross section on a reduced scale, on the line 2—2 of Figure 1.
Figure 3:
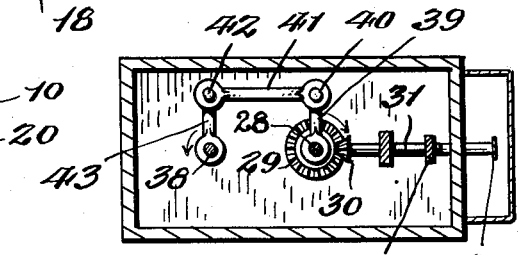
Figure 3 is a similar view on the line 3—3 of Fig. 1.
Figure 4:
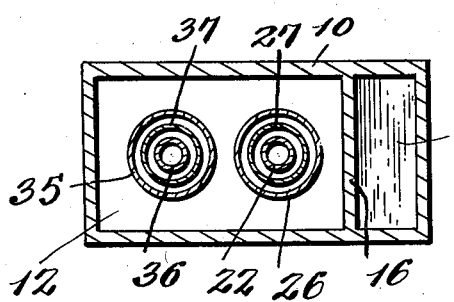
Figure 4 is a further cross section on the line 4—4 of Figure 1.

There is illustrated a casing 10 divided into compartments 11, 12, and 13 by transverse partitions 14 and 15, the former extending the full width of the casing, and the latter adjoining a vertical partition 16 defining a well 17.

The compartment 11 houses a prime mover, such as an electric motor 18, or otherwise. The prime mover includes a driven shaft 19 having a gear 20 in mesh with a gear 21 fixed upon an inlet pipe 22, the gear 21 being in mesh with a gear 23 fixed to a shaft 24 revolubly journalled in the wall 14. The inlet pipe 22 includes a pipe 25 extended exteriorly of the casing to a source of fluid to be measured.

Figure 5:
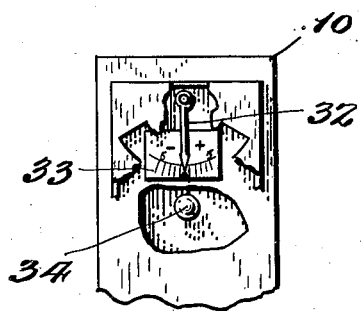
Figure 5 is a fragmentary end elevation of the device showing the use of the invention embodying the indicating means.

The inlet pipe 22 has fixed thereto for rotation therewith a cup 26, the pipe 22 extending upwardly therein to the level of the upper edge of the cup, and extended downwardly into the cup there is an inverted cup 27 carried by a shaft 28 revolubly journalled in the partition 15. The shaft 28 has a bevelled gear 29 in mesh with a gear 30 carried by a shaft 31 extending across the well 17, the extremity of the shaft terminating exteriorly of the casing and having an indicator 32 fixed thereto. Obviously the indicator may be coordinated with a scale 33 (see Fig. 5) or the shaft 31 may actuate a scriber for obtaining a record upon a chart, if desired. The motion imparted to the shaft of the indicator is preferably balanced through a pendulum 34 fixed to the shaft 31.

The shaft 24 has fixed thereto a cup 35 of the same diameter as the cup 26, but of slightly greater depth, for a purpose as will presently appear. An upstanding pipe 36 is mounted upon the base of the cup 35 of lesser height than the walls of the cup.

An inverted cup 37 is disposed in the cup 35 surrounding the pipe 36, the cup being revolubly journalled in the partition 15 of the casing by virtue of a shaft 38.

The shafts 28 and 38 are interconnected through a link 39 fixed to the shaft 28 and having a pivot 40 receiving a link 41, pivotally connected as at 42 to a link 43 fixed to the shaft 38.

An outlet 44 is provided in communication with the compartment 12, positioned at a level approximately at the height of the upper edge of the cup 26, for a reason as will appear from the description of the invention.

Inasmuch as the connection between the pipe 22 and the inlet 25 must be of a revoluble type, this may be accomplished through a packing 45, which may be of a flexible character.

In use, the cup 35 is filled with a liquid of known viscosity up to a point corresponding to the height of the upper edge of the cup 26. The fluid to be measured as to viscosity is now admitted through the inlet 25, discharging over the upper end of the pipe 22 into the cup 26 and over the edge thereof. This fluid is admitted until the chamber 12 is filled up to a level with the lower periphery of the outlet 44.

The prime mover 18 is now started, imparting rotation of the cup 26 by virtue of gears 20—21 and also imparting rotation of the cup 35 through intermeshing of gear 23 with the gear 21. However, rotation of the cup 35 is in the opposite direction to the cup 26. It will be obvious that the liquid in cup 35 will assume the same temperature as the liquid entering the cup 26 since it is immersed therein, and thus a liquid of known viscosity will be compared with a liquid of unknown viscosity.

As cups 26 and 35 revolve it will cause the liquids in them to turn in the same direction as the respective cups. The friction of the revolving liquids will cause inverted cups 27 and 37 to turn in the direction of their respective cups 26 and 35, and since the inverted cups 27 and 37 are connected through links 39, 41 and 43 are connected so that their turning forces oppose each other, this difference in force will be imparted to the shaft 31 through the gears 29—30 to the shaft 31 and finally to the indicator or scriber 32 which may be indicated or scribed as desired, balanced through the pendulum 34.

While I have shown and described a preferred construction this is by way of illustration only, and I consider as my own all such modification in structure as fairly fall within the scope of the appended claims.

I claim:—

1. A continuous viscosity meter comprising a casing, a pair of revoluble cups therein, revoluble members within the cups, each member having a shaft, link members connecting the shafts, an indicator shaft operably connected with the shaft of one of the members, means for rotating the cups in opposite directions, one of the cups having a fluid of known viscosity, and means for supplying fluid to be tested to the other cup.

2. A continuous viscosity meter comprising a casing having a fluid receiving compartment, a pair of revoluble cups therein, one of said cups having an inlet for fluid to be tested, said fluid also having access to the compartment, the other of said cups having a fluid of known viscosity, a revoluble member in each cup, each member having a shaft, link members connecting the shafts, an indicator shaft operably connected with the shaft of one of the members, and means for rotating the cups in opposite directions.

3. A continuous viscosity meter comprising a casing having a pair of transverse partitions defining superposed compartments, the intermediate compartment having an outlet intermediate its height, a pair of cup members within the compartment, one of the cups having a pipe depending medially therefrom and revolubly journalled in the lower partition, the pipe extending upwardly in the cup to the level of the upper edge thereof, a gear fixed to a lower portion of the pipe outwardly of the partition, a shaft depending medially from the other cup and journalled in the lower partition, said shaft having a gear fixed thereto and in mesh with the first named gear, the second named cup having an upstanding tube of a diameter corresponding to the pipe of the first named cup, and said cup further having a height greater than the first named cup, an inverted cup within each first named cups, said inverted cups having respective shafts journalled in the upper partition, the inverted cup associated with the first named cup having a bevel gear fixed thereto, an indicator or recorder shaft, said shaft having a gear in mesh with the bevel gear, each of the shafts of the inverted cups having a laterally extended link, a lever connecting the links, a liquid inlet connected with the pipe of the first named cup, permitting passage of liquid into the cup and into the intermediate compartment to a level with the outlet thereof, a liquid of known viscosity in the second named cup, and a prime mover associated with the first named gears whereby to impart opposite rotation of said cups.

4. The structure of claim 3, in which the indicator shaft includes a pendulum.

HOWARD H. DECKER.